United States Patent [19]

Kieffer et al.

[11] Patent Number: 4,512,877
[45] Date of Patent: Apr. 23, 1985

[54] PROCESS FOR IMPROVING THE QUALITY OF CATALYTICALLY CRACKED GASOLINE

[75] Inventors: Eduard P. Kieffer; Swan T. Sie, both of Amsterdam, Netherlands

[73] Assignee: Shell Oil Company, Houston, Tex.

[21] Appl. No.: 629,871

[22] Filed: Jul. 11, 1984

[30] Foreign Application Priority Data

Jul. 14, 1983 [NL] Netherlands .................. 8302520

[51] Int. Cl.$^3$ ............................................. C10G 35/06
[52] U.S. Cl. ....................................... 208/136; 208/135
[58] Field of Search ............................ 208/136, 135

[56] References Cited

U.S. PATENT DOCUMENTS 4,208,305  6/1980  Kouwenhoven et al. ............ 502/74

Primary Examiner—Curtis R. Davis

[57] ABSTRACT

A process is disclosed whereby a full range catalytically cracked gasoline is upgraded over a mixture of Zn/Cr catalyst and a crystalline iron silicate catalyst having a $SiO_2/Fe_2O_3$ molar ratio of 10–250 or a mixture of a Zn/Cr catalyst and a crystalline iron/aluminum silicate catalyst having a $SiO_2/Fe_2O_3$ molar ratio below 250 and a $SiO_2/Al_2O_3$ molar ratio of at least 500.

14 Claims, No Drawings

PROCESS FOR IMPROVING THE QUALITY OF CATALYTICALLY CRACKED GASOLINE

BACKGROUND OF THE INVENTION

The invention relates to a process for improving the quality of gasoline obtained by catalytic cracking.

Gasoline produced by catalytic cracking has a high olefins content, which is the reason why it shows a tendency to gumminess. Furthermore gasoline produced by catalytic cracking has a relatively low aromatics content, which is the reason whey it has a relatively low octane number. On account of the aforementioned properties it is preferred to subject gasoline obtained by catalytic cracking to quality improving treatment before using it as a mixing component for motor gasoline. This improvement of the quality may be performed by catalytic reforming in which, among other things, the olefins content decreases and the aromatics content increases. A drawback to the catalytic reforming of gasoline produced by catalytic cracking is its high content of sulfur and nitrogen compounds. Since the presence of sulfur and nitrogen compounds in the feed has a very unfavorable influence on the performance of reforming catalysts, said compounds must be removed from the feed to a considerable extent before the latter can be subjected to catalytic reforming. This requires a catalytic hydrotreatment under extra severe conditions. Although the above-mentioned two-step process in which the gasoline is first subjected to a catalytic hydrotreatment under extra severe conditions and then to catalytic reforming results in a substantial betterment of the gasoline produced by catalytic cracking, there is an urgent need for a process which leads to the object aimed at in a single step.

Recently, novel crystalline metal silicates of a special structure were synthesized which show catalytic activity in the conversion of non-aromatic organic compounds, such as olefins, into aromatic hydrocarbons. The catalytic performance of these silicates is to a great extent insusceptible to the presence of sulfur and nitrogen compounds in the feed. The crystalline metal silicates concerned are characterized in that after one hour's calcination in air at 500° C. they have the following properties:

(a) an X-ray powder diffraction pattern in which the strongest lines are the four lines mentioned in Table A,

TABLE A

| d (Å) |
| --- |
| 11.1 ± 0.2 |
| 10.0 ± 0.2 |
| 3.84 ± 0.07 |
| 3.72 ± 0.06, and |

(b) have a composition which, in addition to $SiO_2$, includes $Fe_2O_3$ and/or $Al_2O_3$, and in which the $SiO_2/(Fe_2O_3+Al_2O_3)$ molar ratio is higher than 10.

An investigation into the use of the above-mentioned crystalline iron, aluminum, and iron/aluminum silicates as catalysts for improving the quality of a complete gasoline fraction such as it occurs in a product obtained by catalytic cracking has shown that although, generally, by using crystalline silicates belonging to this group a reduction of the olefins content as well as a rise in the aromatics content can be achieved, there are a number of cases in which the results obtained are not good enough to decide to use them on a technical scale. The investigation has shown that, on account of the activity, selectivity and stability the abovementioned crystalline metal silicates exhibit when used for improving the quality of a complete gasoline fraction as it occurs in a product obtained by catalytic cracking, they can be divided into three classes.

Class I comprises the iron silicates and iron/aluminum silicates having a $SiO_2/Fe_2O_3$ molar ration lower than 250 and a $SiO_2/Al_2O_3$ molar ratio of at least 500.

Class II comprises the aluminum silicates and iron/aluminum silicates having a $SiO_2/Al_2O_3$ molar ratio lower than 500.

Class III comprises the iron silicates, aluminum silicates and iron/aluminum silicates having a $SiO_2/Fe_2O_3$ molar ratio of at least 250 and a $SiO_2/Al_2O_3$ molar ratio of at least 500.

The crystalline metal silicates belonging to class I have sufficient activity, selectivity and stability and are therefore suitable for use such as they are. The crystalline metal silicates belonging to class II have sufficient activity and selectivity, but insufficient stability. The crystalline metal silicates belonging to class II have sufficient activity and selectivity, but insufficient stability. The crystalline metal silicates belonging to class III have insufficient activity. The crystalline metal silicates belonging to classes II and III cannot therefore be used such as they are.

Further investigation into this subject has resulted in three measures which have an extremely favorable influence on the selectivity or the stability of the catalysts mentioned hereinbefore. The invention relates to the application ot these measures (hereinafter referred to as measures 1–3) either individually or combined. Since these measures are unable to improve the activity of the catalysts mentioned hereinbefore, the metal silicates belonging to class III, which have insufficient activity, will not be considered here.

Measure 1 relates to the use of a mixture of two catalysts, one of which is the crystalline metal silicate. Measure 1 leads to considerable enhancement of the selectivity. Since measure 1 is unable to improve the stability of the abovementioned catalysts, this measure when used individually, is only suitable for metal silicates belonging to class I. These metal silicates show sufficient selectivity in themselves, but the use of measure 1 adds still considerably further to the selectivity of these metal silicates.

Measure 2 relates to the use of the metal silicate with a heavy fraction, which fraction has a give aromatics content and has been separated by distillation from the complete gasoline fraction present in the product obtained by catalytic cracking. Measure 2 leads to considerable enhancement of the selectivity. Since measure 2, like measure 1, is unable to improve the stability of the aforementioned catalysts, this measure when used individually, or optionally together with measure 1, is only suitable for metal silicates belonging to class I. As remarked before, these metal silicates show sufficient selectivity in themselves, but the use of measure 2 adds still considerably to their selectivity and it may be enhanced even further, if desired, by combining measure 2 with measure 1.

Measure 3 relates to the use of the metal silicate with a mixture of a light and a middle fraction, which mixture has a given aromatics content and has been separated by distillation from the complete gasoline fraction present in the product obtained by catalytic cracking. Measure 3 leads to such an improvement of the stability that metal silicates belonging to class II, which as such have insufficient stability, are now suitable for use. Measure 3 is also suitable for metal silicates in themselves, but the use of measure 3 adds still considerably to their stability. If desired, measure 3 can be combined with measure 1 and/or measure 2, which, in addition to enhancement of stability, results in considerable enhancement of selectivity—when measure 1 or 2 is used—or very considerable enhancement of selectivity—when both measures 1 and 2 are used.

The present patent application forms the subject matter of Netherlands patent application No. 8302520 (K-5691) and relates to the application of measure 1 when metal silicates belonging to class I are used. The application of measure 2 when using metal silicates belonging to class I forms the subject matter of Netherlands patent application no. 8302519 (K-5692). The application of measure 3, optionally combined with measure 2, when metal silicates belonging to classes I and II are used, forms the subject matter of Netherlands patent application No. 8302518 (K-5704).

SUMMARY OF THE INVENTION

In the application of measure 1 use is made of a mixture of two catalysts, one of which is a zinc-containing composition which, in addition to zinc, comprises chromium and/or aluminum and which composition has been prepared by calcining one or more precipitates obtained by adding a basic reacting substance to one or more aqueous solutions containing salts of the metals involved, the other being a crystalline metal silicate belonging to class I. Said catalyst mixtures were developed some time ago for the conversion of low-hydrogen synthesis gases into aromatic hydrocarbon mixture. In this conversion the zinc-containing composition has a double function. Firstly this catalyst component's function was to catalyze the conversion of synthesis gas into methanol (methanol synthesis function). Secondly this catalyst component's function was to catalyze the formation of hydrogen from the excess carbon monoxide present and the water formed in the conversion of methanol into aromatic hydrocarbons (CO shift function). In view of the above, the present finding, by which the selectivity of a metal silicate belonging to class I when the latter is used as catalyst for improving the quality of a gasoline produced by catalytic cracking can be considerably enhanced by mixing the metal silicate with said zinc-containing composition, is considered to be extremely surprising.

DETAILED DESCRIPTION OF THE INVENTION

The present patent application therefore relates to a process for improving the quality of a gasoline produced by catalytic cracking, in which the gasoline is contacted with a mixture of two catalysts, one of which is the above-mentioned zinc-containing composition and the other a crystalline metal silicate belonging to class I.

In the present process the starting material is a gasoline produced by catalytic cracking. Such gasolines may very suitably be prepared by applying catalytic cracking to heavy hydrocarbon oils such as atmospheric gas oils, vaccum gas oils, deasphalted distillation residues and mixtures thereof. Preference is given to the use of a gas oil as feed. Catalytic cracking on a commercial scale is generally carried out in a continuous process using an arrangement which substantially consists of a vertically disposed cracking reactor and a catalyst regenerator. Hot regenerated catalyst leaving the regenerator is suspended in the oil to be cracked and then the mixture is passed through the cracking reactor in upward direction. The deactivated catalyst is separated from the cracked product, stripped and transferred to the regenerator. The cracked product is separated to form a light fraction having a high content of $C_3$ and $C_4$ olefins, a gasoline fraction and several heavy fractions such as a light cycle oil, a middle cycle oil, a heavy cycle oil and a slurry oil.

The crystalline metal silicate which in the present process is used as catalyst component should have a $SiO_2/(Fe_2O_3+Al_2O_3)$ molar ratio higher than 10, a $SiO_2/Fe_2O_3$ molar ratio lower than 250 and a $SiO_2/Al_2O_3$ molar ratio of at least 500. Preference is given to the use either of crystalline iron silicates having a $SiO_2/Fe_2O_3$ molar ratio higher than 25, but lower than 250 and in particular of 50–175, or of crystalline iron-/aluminum silicates having a $SiO_2/Fe_2O_3$ molar ratio higher than 25, but lower than 250 and in particular of 50–175 and a $SiO_2/Al_2O_3$ molar ratio of at least 500, but lower than 1200 and in particular of at least 500, but lower than 800. The crystalline silicates are defined, among other things, by the X-ray powder diffraction pattern which they show after one hour's calcination in air at 500° C. On this pattern the strongest lines should be the four lines mentioned in Table A. The complete X-ray powder diffraction pattern of a typical example of the present crystalline silicates after one hour's calcination in air at 500° C. is given in Table B.

TABLE B

| d (Å) | Rel. int. | d (Å) | Rel. int. |
|---|---|---|---|
| 11.1 | 100 | 3.84 (D) | 57 |
| 10.1 (D) | 70 | 3.72 (D) | 31 |
| 8.93 | 1 | 3.63 | 16 |
| 7.99 | 1 | 3.47 | <1 |
| 7.42 | 2 | 3.43 | 5 |
| 6.68 | 7 | 3.34 | 2 |
| 6.35 | 11 | 3.30 | 5 |
| 5.97 | 17 | 3.25 | 1 |
| 5.70 | 7 | 3.05 | 8 |
| 5.56 | 10 | 2.98 | 11 |
| 5.35 | 2 | 2.96 | 3 |
| 4.98 (D) | 6 | 2.86 | 2 |
| 4.60 | 4 | 2.73 | 2 |
| 4.35 | 5 | 2.60 | 2 |
| 4.25 | 7 | 2.48 | 3 |
| 4.07 | 2 | 2.40 | 2 |
| 4.00 | 4 | | |

(D) = doublet

The crystalline silicates can be prepared starting from an aqueous mixture comprising the following compounds: one or more silicon compounds, one or more compounds which contain a monovalent organic cation (R) of from which such a cation is formed during the preparation of the silicate, one or more compounds in which iron is present in trivalent form and, if desired, one or more aluminum compounds and one or more compounds of an alkali metal (M). The preparation is carried out by keeping the mixture at an elevated temperature until the silicate has formed, and subsequently separating the silicate crystals from the mother liquor and washing, drying and calcining the crystals. In the aqueous mixture from which the silicates are prepared the various compounds should be present in the following ratios, expressed in moles of the oxides:

$M_2O : SiO_2 < 0.35$,
$R_2O : SiO_2 = 0.01-0.5$,
$SiO_2 : (Fe_2O_3 + Al_2O_3) > 10$, and
$H_2O : SiO_2 = 5-100$.

If in the preparation of the crystalline silicates the starting material is an aqueous mixture in which one or more alkali metal compounds are present, the crystalline silicates obtained will contain alkali metal. Depending on the concentration of alkali metal compounds in the aqueous mixture the crystalline silicates obtained may contain more than 1%w alkali metal. Since the presence of alkali metal in the crystalline silicates has an unfavorable influence on their catalytic properties, it is common practice in the case of crystalline silicates with a relatively high alkali metal content to reduce this content before using these silicates as catalysts. A reduction of the alkali metal content to less than 0.05%w is usually sufficient to this end. The reduction of the alkali metal content of crystalline silicates can very suitably be effected by treating the silicates once or several times with a solution of an ammonium compound. During this treatment alkali metal ions are exchanged for $NH_4^+$ ions and the silicate is converted to the $NH_4^+$ form. The $NH_4^+$ form of the silicate is converted to the $H^+$ form by calcination.

In the preparation of the catalyst mixtures used in the present process use is made of one or more precipitates in which zinc occurs together with chromium and/or aluminum and which precipitates have been obtained by adding a basic reacting substance to one or more aqueous solution of salts of the metals involved. Preference is given to the use of precipitates in which, in addition to zinc, chromium occurs, in particular precipitates in which the atomic percentage of zinc, calculated on the sum of zinc and chromium, is at least 60% and more specifically 60-80%. The metal-containing precipitates may be prepared by precipitation of each of the metals individually or by co-precipitation of the desired metal combination. Preference is given to the use of a co-precipitate obtained by adding a basic reacting substance to an aqueous solution containing all the metals involved. This co-precipitation is preferably carried out in a mixing unit with a continuous supply of an aqueous solution containing the metal salts involved and an aqueous solution of the basic reacting substance in a stoichiometric quantity calculated on the metals, and with a continuous discharge of the co-precipitate formed.

The preparation of the catalyst mixtures used in the present process can be carried out in various ways. The precipitate may be calcined and then mechanically mixed with the crystalliine silicate. The catalyst mixture may also very suitably be prepared by spray-drying. To this end the crystalline silicate is dispersed in water together with the precipitate mentioned hereinbefore, the dispersion thus obtained is spray-dried, and the spray-dried material is calcined. Spray-drying is a method used on a commercial scale for many years past for the preparation of small spherical particles from a solid material or a mixture of solids. The process is carried out by atomizing a dispersion in water of the material to be spray-dried through a nozzle or from a rotating disc into a hot gas. The process is particularly suitable for achieving intimate contact between different materials. In view of the form, size and strength of the catalyst particles prepared by spray-drying they are very suitable for use in a fluidized state.

As regards the ratio of the zinc-containing composition to the crystalline silicate in the catalyst mixtures used in the present process, preference is given to the use of catalyst mixtures which per part by weight silicate contain 0.1-12.5, and in particular 0.5-8, parts by weight metal oxides coming from the precipitate.

The present process can very suitably be carried out by passing the feed in upward or downward direction through a vertically disposed reactor containing a fixed or moving bed of the catalyst mixture. Suitable conditions for carrying out the process are a temperature of 300-600° C., a pressure of 1-50 bar and a space velocity of 0.1-10 $kg.kg^{-1}.h^{-1}$. The process is preferably carried out under the following conditions: a temperature of 400°-500° C., a pressure of 2.5-25 bar and a space velocity of 0.2-3 $kg.kg^{-1}.h^{-1}$. The process may be carried out in the presence of hydrogen, if desired.

The invention is now illustrated by the following example.

EXAMPLE

Preparation of Catalyst 1

An iron/aluminum silicate was prepared by heating a mixture of sodium hydroxide, tetrapropylammonium hydroxide, ferric nitrate, sodium aluminate and amorphous silica in water in an autoclave under autogeneous pressure for 24 hours at 150° C. After cooling of the reaction mixture the silicate formed was filtered off, washed with water until the pH of the wash water was about 8 and dried at 120° C. After one hour's calcination in air at 500° C. the silicate had the following properties:

(a) an X-ray powder diffraction pattern substantially corresponding with that mentioned in Table B,
(b) a $SiO_2/Al_2O_3$ molar ratio of 600, and
(c) a $SiO_2/Fe_2O_3$ molar ratio of 130.

The iron/aluminum silicate prepared in the above-described manner was boiled with a 1.0 molar ammonium nitrate solution, washed with water, boiled again with a 1.0 molar ammonium nitrate solution, washed and dried at 120° C. Catalyst 1 was prepared by pressing and grinding the dried material to have a particle size of 0.4 mm and calcining the ground material at 500° C.

Preparation of Catalyst 2

Such quantities of $Zn(NO_3)_2.6H_2O$ and $Cr(NO_3)_3.9H_2O$ were dissolved in water as to produce a solution in which the $Zn/(Zn+Cr)$ atomic ratio was 0.67. This solution, together with a stoichiometric quantity of a 10% aqueous $NH_3$ solution, was pumped with stirring through a mixing unit which was kept at a temperature of 20° C. The Zn/Cr co-precipitate obtained was collected and left to age for one hour with stirring at 20° C. The solid material was filtered off, washed with water until the wash water was free of $NO_3^-$ ions and dried at 120° C. Catalyst 2 was prepared by pressing and grinding the dried material to have a particle size of 0.4 mm, and calcining the ground material at 400° C.

Preparation of Catalyst 3

This catalyst was prepared by mixing Catalysts 1 and 2 in a weight ratio 1:5.

Catalysts 1 and 3 were tested in four experiments (Experiments 1-4) for enhancing the quality of two gasolines produced by catalytic cracking (Gasolines A and B). Both gasolines constituted the complete $C_5^+$ gasoline fraction present in the cracked products from which they had been separated. Gasoline A had a RON-O (research octane number without addition of lead) of 92.3 and Gasoline B had a RON-O of 85.4. The experiments were carried out in a reactor containing a fixed catalyst bed. In all the experiments were used a temperature of 450° C. and a pressure of 5 bar. The space velocities used in the experiments (calculated on the quantities of silicate present in the catalysts) and the results of the experiments are listed in Table C.

The values given in Table C for $\Delta C_5^+/\Delta RON\text{-}O$ (loss of $C_5^+$ hydrocarbons per point gained in RON-O) represent a criterion of selectivity. According as the $\Delta C_5^+/\Delta RON\text{-}O$ is lower, the catalyst has better selectivity.

The values given in Table C for the rates of catalyst deactivation are a criterion of stability. The rate of catalyst deactivation is defined as the average reduction of catalyst activity per hour measured over the first 100 run hours. In this connection catalyst activity is understood to be:

$$\frac{(\% \text{ w } C_5^+ \text{non-aromatics in feed}) - (\% \text{ w } C_5^+ \text{non-aromatics in product})}{\% \text{ w } C_5^+ \text{non-aromatics in feed}} \times 100$$

According as the rate of catalyst deactivation is lower, the catalyst has better stability.

TABLE C

| Experiment No. | 1 | 2 | 3 | 4 |
| --- | --- | --- | --- | --- |
| Catalyst No. | 1 | 3 | 1 | 3 |
| Space velocity, $g \cdot g^{-1} \cdot h^{-1}$ | 0.5 | 1.2 | 0.5 | 1.9 |
| Feed gasoline | A | A | B | B |
| RON-O of $C_5^+$ product | 95.0 | 95.2 | 97.0 | 96.7 |
| $\Delta C_5^+/\Delta RON\text{-}O$, % w | 5.1 | 3.9 | 2.1 | 1.5 |
| Rate of catalyst deactivation, $h^{-1}$ | 0.41 | 0.53 | 0.45 | 0.50 |
| $\Delta RON\text{-}O$ | 2.7 | 2.9 | 11.6 | 11.3 |

Of the experiments mentioned in Table C only Experiments 2 and 4 are experiments according to the invention. In these experiments use was made of measure 1 mentioned in the present patent application (use of the silicate mixed with a zinc-containing composition). Experiments 1 and 3 fall outside the scope of the invention. They have been included in the patent application for comparison. In these experiments measure 1 was not used.

On the results mentioned in Table C the following may be observed. Catalyst 1 has sufficient selectivity and stability both when used with gasoline A and with gasoline B. By using measure 1 considerable enhancement of the selectivity is achieved in both cases. It is true that the use of measure 1 is attended with slight deterioration of the stability, but the resulting stability is still amply sufficient.

What is claimed is:

1. A process for improving the quality of a gasoline produced by catalytic cracking, characterized in that the gasoline is contacted with a mixture of two catalysts, one of which is a zinc-containing composition which, in addition to zinc, comprises chromium and/or aluminum, and which composition has been prepared starting from one or more precipitates obtained by adding a basic reacting substance to one or more aqueous solutions containing salts of the metals involved, the other being a crystalline metal silicate which, after one hour's calcination in air at 500° C. has the following properties:

(a) an X-ray powder diffraction pattern in which the strongest lines are the four lines mentioned in Table A,

TABLE A

| d (Å) |
| --- |
| 11.1 ± 0.2 |
| 10.0 ± 0.2 |
| 3.84 ± 0.07 |
| 3.72 ± 0.06, and |

(b) a composition which, in addition to $SiO_2$, includes $Fe_2O_3$ or both $Fe_2O_3$, and in which the $SiO_2/(Fe_2O_3+Al_2O_3)$ molar ratio is higher than 10, the $SiO_2/Fe_2O_3$ molar ratio is lower than 250 and the $SiO_2/Al_2O_3$ molar ratio is at least 500.

2. A process as claimed in claim 1, characterized in that the metal silicate is an iron silicate having a $SiO_2/Fe_2O_3$ molar ratio higher than 25, but lower than 250.

3. A process as claimed in claim 2, characterized in that the metal silicate is an iron silicate having a $SiO_2/Fe_2O_3$ molar ratio of 50–175.

4. A process as claimed in claim 1, characterized in that the metal silicate is an iron/aluminum silicate having a $SiO_2/Fe_2O_3$ molar ratio higher than 25, but lower than 250 and a $SiO_2/Al_2O_3$ molar ratio of at least 500, but lower than 1200.

5. A process as claimed in claim 4, characterized in that the metal silicate is an iron aluminum silicate having a $SiO_2/Fe_2O_3$ molar ratio of 50–175 and a $SiO_2/Al_2O_3$ molar ratio of at least 500, but lower than 800.

6. A process as claimed in claim 1, characterized in that the metal silicate has an alkali metal content of less than 0.05%w.

7. A process as claimed in claim 5, characterized in that the metal silicate has an alkali metal content of less than 0.05%w.

8. A process as claimed in claim 1, characterized in that the zinc-containing composition in addition to zinc comprises chromium, and that the atomic percentage of zinc calculated on the sum of zinc and chromium is 60–80%.

9. A process as claimed in claim 7, characterized in that the zinc-containing composition in addition to zinc comprises chromium, and that the atomic percentage of zinc calculated on the sum of zinc and chromium is 60–80%.

10. A process as claimed in claim 1, characterized in that the catalyst mixture has been prepared by spray-drying.

11. A process as claimed in claim 1, characterized in that per part by weight silicate the catalyst mixture contains 0.1–12.5 parts by weight metal oxides coming from the precipitate.

12. A process as claimed in claim 11, characterized in that per part by weight silicate the catalyst mixture contains 0.5–8 parts by weight metal oxides coming from the precipitate.

13. A process as claimed in claim 1, characterized in that it is carried out at a temperature of 300°–600° C., a pressure of 1–50 bar and a space velocity of 0.1–10 $kg \cdot kg^{-1} \cdot h^{-1}$.

14. A process as claimed in claim 13, characterized in that it is carried out at a temperature of 400°–500° C., a pressure of 2.5–25 bar and a space velocity of 0.2–3 $kg \cdot kg^{-1} \cdot h^{-1}$.

* * * * *